US008762319B2

(12) United States Patent
Kleinberg et al.

(10) Patent No.: US 8,762,319 B2
(45) Date of Patent: Jun. 24, 2014

(54) METHOD, SYSTEM, AND COMPUTER-ACCESSIBLE MEDIUM FOR INFERRING AND/OR DETERMINING CAUSATION IN TIME COURSE DATA WITH TEMPORAL LOGIC

(75) Inventors: Samantha Kleinberg, New York, NY (US); Bhubaneswar Mishra, Great Neck, NY (US)

(73) Assignee: New York University, New York, NY (US)

( * ) Notice: Subject to any disclaimer, the term of this patent is extended or adjusted under 35 U.S.C. 154(b) by 655 days.

(21) Appl. No.: 12/994,122

(22) PCT Filed: May 21, 2009

(86) PCT No.: PCT/US2009/044862
§ 371 (c)(1),
(2), (4) Date: Mar. 25, 2011

(87) PCT Pub. No.: WO2009/158089
PCT Pub. Date: Dec. 30, 2009

(65) Prior Publication Data
US 2011/0167031 A1    Jul. 7, 2011

Related U.S. Application Data

(60) Provisional application No. 61/054,989, filed on May 21, 2008.

(51) Int. Cl.
*G06N 5/00* (2006.01)
(52) U.S. Cl.
USPC .............................................. 706/52; 706/45
(58) Field of Classification Search
USPC ..................................................... 706/52, 45
See application file for complete search history.

(56) References Cited

U.S. PATENT DOCUMENTS

2005/0055166 A1    3/2005   Miyano et al.

FOREIGN PATENT DOCUMENTS

| KR | 10-2005-0060646    | 6/2005 |
| KR | 10-2007-0061107 A  | 6/2007 |
| KR | 10-2008-0030142 A  | 4/2008 |

OTHER PUBLICATIONS

Heckman, Understanding Instrumental Variables in Models with Essential Heterogeneity, The Review of Economics and Statistics, vol. 88, No. 3, 2006, pp. 389-432.*
de la Fuente, et al., Discovery of meaningful associations in genomic data using partial correlation coefficients, Bioinformatics, vol. 20 issue 18, 2004, pp. 3565-3574.*

(Continued)

*Primary Examiner* — Wilbert L Starks
(74) *Attorney, Agent, or Firm* — Andrews Kurth LLP

(57) ABSTRACT

Time-course data with an underlying causal structure may appear in a variety of domains, including, e.g., neural spike trains, stock price movements, and gene expression levels. Provided and described herein are methods, procedures, systems, and computer-accessible medium for inferring and/or determining causation in time course data based on temporal logic and algorithms for model checking. For example, according to one exemplary embodiment, the exemplary method can include receiving data associated with particular causal relationships, for each causal relationship, determining average characteristics associated with cause and effects of the causal relationships, and identifying the causal relationships that meet predetermined requirement(s) as a function of the average characteristics so as to generate a causal relationship. The exemplary characteristics associated with cause and effects of the causal relationships can include an associated average difference that a cause can make to an effect in relation to each other cause of that effect.

39 Claims, 7 Drawing Sheets

(56) References Cited

OTHER PUBLICATIONS

Chuang, et al., A pattern recognition approach to infer time-lagged genetic interactions, Bioinformatics, vol. 24 No. 9, 2008, pp. 1183-1190.*

Kulp, et al., Causal inference of regulator-target pairs by gene mapping of expression phenotypes, BMC Genomics, 7:125, 2006, pp. 1-12.*

Kleinberg, Samantha et al., "Modal Logic, Temporal Models and Neural Circuits: What Connects Them", *CIMS Technical Report: TR2007-907* Feb. 2008, 1-15.

* cited by examiner

METHOD, SYSTEM, AND COMPUTER-ACCESSIBLE MEDIUM FOR INFERRING AND/OR DETERMINING CAUSATION IN TIME COURSE DATA WITH TEMPORAL LOGIC

CROSS-REFERENCE TO RELATED APPLICATION(S)

The present application is a U.S. National Phase of International Application PCT/US2009/044862 filed May 21, 2009, and also claims priority from U.S. patent application Ser. No. 61/054,989, filed May 21, 2008, the entire disclosures of which are hereby incorporated herein by reference in their entireties.

STATEMENT REGARDING FEDERALLY-SPONSORED RESEARCH

The present disclosure was developed, at least in part, using Government support from the National Science Foundation under Grant Number CCF 0523851. Therefore, the Federal Government may have certain rights in the invention.

FIELD OF THE DISCLOSURE

The present disclosure relates to, e.g., methods, systems, computer-accessible medium, and software arrangements for inferring and/or determining causation in time course data using temporal logic.

BACKGROUND INFORMATION

Generally, prior arrangements to study and/or analyze time series data has focused on identifying groups of similar or co-regulated elements using clustering techniques or finding patterns via data mining. However, there has been a limited amount of research performed to infer and determine causal relationships between the elements of these time series. When attempting to decipher the underlying structure of a system, enumeration of the formulas governing its behavior may be one object of such research. For example, the knowledge of what is responsible for patterns of activity may lead to a greater understanding of systems as well as the ability to better predict future events.

In biologically-related systems, one research goal may be to discover dependencies between genes and genes that influence others. These types of networks can provide a model of biological processes that may then be tested and validated using knock-out or exclusionary experiments, for example. Research in this area has primarily used graph-based methods, such as Bayesian Networks, which can be limited in terms of the relationships they may represent and infer.

Earlier attempts in automating the inference of causal relationships have been described in, e.g., J. Pearl, *Causality: Models, Reasoning, and Inference*, Cambridge University Press, 2000, and P. Spirtes, C. Glymour, and R. Scheines, *Causation, Prediction, and Search*. MIT Press, 2000, using graphical models, such as Bayesian networks (BNs). In these approaches, the causal structure of the system may be represented as a graph, where variables can be represented by nodes and the edges between them can represent conditional dependence (and the absence of an edge may imply conditional independence).

A number of assumptions about the data can be used to direct these edges from cause to effect. The result may be a directed acyclic graph (DAG) where a directed edge between two nodes may mean the first causes the second. In these graphical approaches, the edges may be oriented without the use of time course data, as a consequence of the other assumptions. Terminology of SGS may be used their work primarily described though these assumptions and the general procedure are used by many with some variation.

First, it can be assumed that a node in the graph (variable) is independent of every node other than its direct effects conditional on its direct causes (e.g., those that are connected to the node by one edge). This may be referred to as the Causal Markov condition (CMC). The inference of causal structures may rely on two more assumptions: faithfulness and causal sufficiency.

Faithfulness can assume that exactly the independence relations found in the causal graph hold in the probability distribution over the set of variables. This may imply that the independence relations obtained from the causal graph are due to the causal structure generating it. If there are independence relations that are not a result of CMC, then the population may be unfaithful. Faithfulness may be used for determining whether independencies are from some structure, and not from chance coincidence or latent variables.

Causal sufficiency can assume that a set of measured variables includes all of the common causes of pairs on that set. In cases where causal sufficiency does not hold, the inferred graphs may include those with nodes representing unmeasured common causes that can also lead to the observed distribution. Knowledge about temporal ordering may also be used at this point if it is available. In general, the conditional independence conditions can be assumed to be exact conditional independence, though it may be possible to define some threshold to decide when two variables will be considered independent. The result may be a set of graphs that represent the independencies in the data, where the set may contain only one graph in some cases when all assumptions are fulfilled.

However, when using these graphical models there may be no natural way of representing or inferring and/or determining the time between the cause and the effect or a more complex causal relationship than just one node causing another at some future time. An update to Bayesian networks (BNs), dynamic Bayesian networks (DBNs) (see, e.g., N. Friedman, K. Murphy, and S. Russell, *Learning the structure of dynamic probabilistic networks, In Proceedings of the Fourteenth Conference on Uncertainty in Artificial Intelligence (UAI98)*, pp. 139-147, 1998) can be introduced to address the temporal component of these relationships. DBNs extend BNs, to show how the system evolves over time. For this purpose, they begin with a prior distribution (described by a DAG structure) as well as two more DAGs: one representing the system at time t and another at t+1, where these hold for any values of t. The connections between these two time slices then may describe the change over time. Similarly to the above, there may generally be one node per variable, with edges representing conditional independence.

This can imply that while the system may start in any state, after that, the structure and dependencies may repeat themselves. For example, the relationships from time 10 to 11 may be exactly the same as those from time 11 to 12. Research by Eichler and Didelez (M. Eichler and V. Didelez, *Causal reasoning in graphical time series models. In Proceedings of the 23$^{rd}$ Annual Conference on Uncertainty in Artificial Intelligence*, 2007) has largely focused on time series and explicitly capturing the time elapsed between cause and effect. They define that one time series may cause another if an intervention on the first alters the second at some later time. For example, there can be lags of arbitrary length between the series, and these lags may be found to be part of the inference process. While it may be possible to also define the variables in this framework such that they represent a complex causal relationship as well as the timing of the relationship, the resulting framework can still not easily lead to a general method for determining these relationships. Further, while DBNs are a compact representation in the case of sparse structures, it may be difficult to extend them to the case of highly dependent data sets with thousands of variables, none of which can be eliminated.

With respect to one thing causing another, particularly in terms of scientific data, rarely is it as simple as "a causes b", deterministically, with no other relevant factors. Work by Langmead et al. (2006) (C. Langmead, S. Jha, and E. Clarke, *Temporal logics as query languages for dynamic bayesian networks: Application to d. melanogaster embryo development. Technical Report CMU-CS-06-159*, Carnegie Mellon University, 2006) describes the use of temporal logic for querying pre-existing DBNs, by translating them into structures that may allow for model checking. This approach may facilitate the use of known DBNs for inference of relationships described by temporal logic formulae. However, only a subset of DBNs can be translated in this way (see, e.g., Langmead, 2008) (C. J. Langmead, *Towards inference and learning in dynamic bayesian networks using generalized evidence. Technical Report CMU-CS-08-151*, Carnegie Mellon University, 2008.), and thus the benefit of this approach (as opposed to one where the model inferred already allows for model checking) can be limited.

In terms of experimental work, research has been performed in applying notions of causality to the problem of determining relationships among genes (usually from microarray data). Techniques used for inferring and modeling causality amongst genes include, e.g.,: Granger causality, Bayesian networks, mutual information and likelihood-based approaches. Each method can begin with pairwise correlations across the entire time series, connecting them to form graphs of networks. However, it can be difficult to see how the network describing one set of experiments differs from that of another (e.g., between two cancer patients). One method can begin with a correlation network and transform it into one that includes causation. The partially directed network employed may allow for the visualization of multiple relationship types simultaneously, as well as the identification of hub nodes. However it does not easily lead to the probabilistic rules that may be useful in various applications, such as when applied to financial data, for example.

The conventional methods do not appear to facilitate an explicit reasoning about the elapsed time between cause and effect, probabilities of causation as well as relationships more complex than one-to-one, which can be especially useful when attempting to make inferences and/or determinations in time course data, particularly in the case of such data with additional background knowledge.

Thus, there appears to be a need to address at least some of the deficiencies described above. Accordingly, exemplary embodiments of a framework, system, process, computer-accessible medium and software arrangement according to the present disclosure can be provided using which, arbitrarily complex causal relationships can be, e.g., inferred, described and analyzed.

SUMMARY OF EXEMPLARY EMBODIMENTS

Accordingly, it can be beneficial to provide exemplary embodiments of a framework, system, process, computer-accessible medium and software arrangement according to the present disclosure can be provided using which, arbitrarily complex causal relationships can be, e.g., inferred, described and analyzed. With such exemplary system, process, computer-accessible medium and software arrangement and framework can be provided which can facilitate richer causal relationships having greater complexity than simple chains of causes or sets of correlated events may be formed, determined and utilized, for example.

Provided herein, for example, is an exemplary method for determining at least one causal relationship of at least two elements associated with time course data. The exemplary method can include receiving data associated with a plurality of particular causal relationships, and for each causal relationship, using at least one computing arrangement, determining average characteristics associated with cause and effects of the particular causal relationships. The exemplary method can further include identifying the particular causal relationships that meet at least one predetermined requirement as a function of the average characteristics so as to generate at least one causal relationship. The two elements over which causal relationships are determined can be at least one of, e.g, objects, a collection of objects, individuals, collections of individuals, events, a collection of events, logical formulas over objects, individuals and events, or temporal logical formulas over objects, individuals and events. The exemplary characteristics associated with cause and effects of the particular causal relationships can include an associated average difference that a particular cause can make to a particular effect in relation to other potential causes of that particular effect. The exemplary data can include background information associated with at least one of the particular causal relationships, for example.

The exemplary method can further include translating exemplary values for the exemplary average characteristics associated with cause and effects of the exemplary particular causal relationships into z-values. In various exemplary embodiments, the particular causal relationships can be identified using a false discovery rate control procedure. The exemplary particular causal relationships can be expressed in terms of a probabilistic temporal logic. According to various exemplary embodiments, the exemplary method may further include at least one of displaying or storing information associated with the causal relationship in a storage arrangement in at least one of a user-accessible format or a user-readable format.

Also provided herein is exemplary computer-accessible medium containing executable instructions thereon. When a computing arrangement executes the instructions, the computing arrangement can be configured to perform exemplary procedures, which can include receiving data associated with a plurality of particular causal relationships, and for each causal relationship, determining average characteristics associated with cause and effects of the particular causal relationships. The exemplary computer-accessible medium can further include identifying the particular causal relationships that meet at least one predetermined requirement as a function of the average characteristics so as to generate at least one causal relationship. Exemplary characteristics associated with cause and effects of the particular causal relationships can include an associated average difference that a particular cause makes to a particular effect in relation to other potential causes of that particular effect.

The executable instructions can include exemplary procedures associated with an exemplary model of causality which can include a plurality of particular causal relationships expressed in terms of a probabilistic temporal logic. The at least one causal relationship can include a plurality of causal relationships, and the exemplary data can include background information associated with at least one of the plurality of causal relationships. The exemplary processing arrangement can be further configured to translate values for the average characteristics associated with cause and effects of the particular causal relationships into z-values, for example. Exemplary particular causal relationships can be identified as those for which there is a low associated false discovery rate.

In addition, provided herein is an exemplary system for determining a causal relationship of at least two elements of time course data. The exemplary system can include a computer-accessible medium having executable instructions thereon, wherein when a computing arrangement executes the instructions, the computing arrangement can be configured to receive data associated with a plurality of particular causal relationships, and, for each particular causal relationship, determine average characteristics associated with cause and effects of the particular causal relationships. The exemplary computing arrangement can be further configured to identify the particular causal relationships that meet at least one exemplary predetermined requirement as a function of the exemplary average characteristics so as to generate at least one causal relationship.

The executable instructions can include procedures associated with a model of causality which can include a plurality of particular causal relationships expressed in terms of a probabilistic temporal logic. Exemplary data can include background information associated with at least one of the particular causal relationships. When the exemplary processing arrangement executes the instructions, the processing arrangement can be further configured to translate values for the exemplary average characteristics associated with cause and effects of the particular causal relationships into z-values, for example. The exemplary particular causal relationships can be identified using a false discovery rate control procedure.

Further, provided herein is exemplary computer-accessible medium containing an exemplary model of causality and executable instructions thereon. When a computing arrangement executes the instructions, the computing arrangement can be configured to perform procedures including receiving data associated with a plurality of particular causal relationships, for each causal relationship, determining average characteristics associated with cause and effects of the particular causal relationships, and identifying the particular causal relationships that meet at least one predetermined requirement as a function of the average characteristics so as to generate at least one causal relationship. The exemplary model of causality can include a plurality of particular causal relationships expressed in probabilistic temporal logic, for example.

These and other objects, features and advantages of the present invention will become apparent upon reading the following detailed description of exemplary embodiments of the present disclosure, when taken in conjunction with the appended claims.

BRIEF DESCRIPTION OF THE DRAWINGS

Further objects, features and advantages provided by the present disclosure will become apparent from the following detailed description taken in conjunction with the accompanying figures showing illustrative embodiments, in which.

Figure 1:
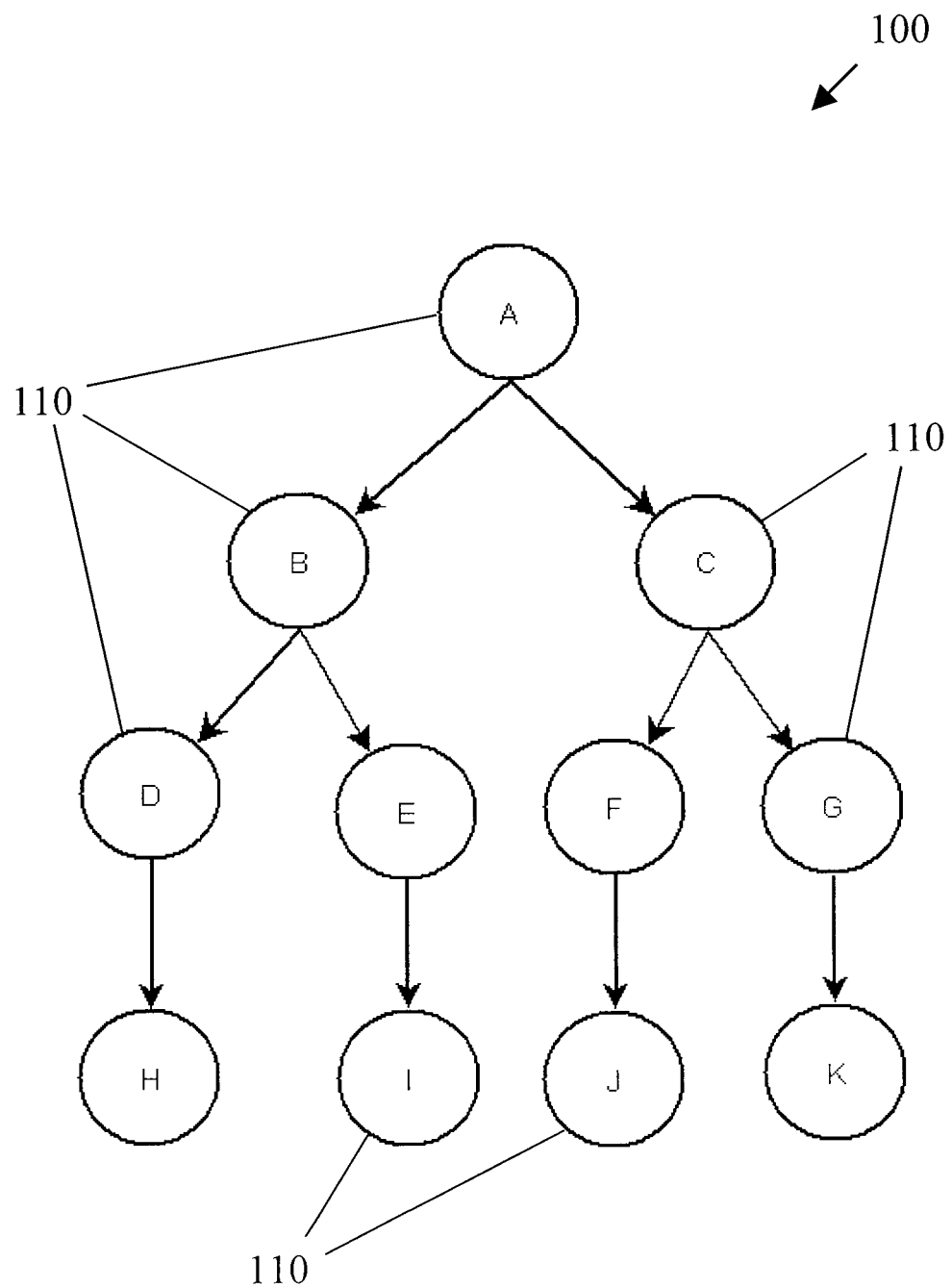
FIG. 1 is an exemplary embodiment of a causal structure in accordance with the present disclosure, which illustrates that a neuron at the tail can cause a neuron at the head to fire within a defined time window with a relatively-high probability.

Throughout the figures, the same reference numerals and characters, unless otherwise stated, are used to denote like features, elements, components or portions of the illustrated embodiments. Moreover, while the present disclosure will now be described in detail with reference to the accompanying figures, it is done so in connection with the illustrative embodiments. It is intended that changes and modifications can be made to the described embodiments without departing from the true scope and spirit of the present disclosure.

DETAILED DESCRIPTION OF EXEMPLARY EMBODIMENTS

Described herein are, e.g., exemplary embodiments of methods, systems, computer-accessible medium, software arrangements and processing arrangements for inferring and determining causation in time course data using temporal logic according to the present disclosure. By posing questions about how two elements may be related in terms of model checking and inference, relationships in large datasets with many variables can be inferred and/or determined using such exemplary embodiments. The two elements over which causal relationships are determined can be at least one of, e.g., objects, a collection of objects, individuals, collections of individuals, events, a collection of events, logical formulas over objects, individuals and events, or temporal logical formulas over objects, individuals and events. Various combinations of these and other elements can also be used.

For example, elements can include, but are certainly not limited to, e.g., pattern(s) of stock movement, world events, occurrence of news stories and certain text within news stories. Other examples of elementes can include, e.g., an absence of an event (e.g., negation and/or non-occurance of an event) and a non-physical event and/or condition (e.g., a mental state or an action, such as, providing instructions, hearing news or obtaining information). Further, an element, such as en event can occur (or not occur) at a single point in time (e.g., with virtually no or very little duration of time) or can have a longer and/or significant duration of time (e.g., smoking for a particular number of years, such as 10 years, can be an element). When discussing causality, particularly in terms of scientific data, for example, it may typically not be as simple as, e.g., "a causes b" deterministically with no other relevant factors. One exemplary example of causality and causal inference is the relationship between smoking and lung cancer.

For example, while it is generally accepted that "smoking causes lung cancer", the relationship may be more similar to that described as an INUS condition (e.g., insufficient but necessary part of an unnecessary but sufficient condition). There are other ways of getting lung cancer, and there are other conditions necessary for smoking to cause lung cancer. Therefore, e.g., smoking may be a necessary part of some set of conditions, which together may be sufficient to cause lung cancer, though none may cause it alone. Thus, for example, described herein are exemplary embodiments of methods, systems and software for inferring and determining, e.g., the further details of this causal relationship when analyzing data on smoking and lung cancer. These exemplary types of inferences and/or determinations can be present in many of the time course data sets analyzed in addition to being found in idealistic examples.

Other exemplary embodiments can involve describing how a set of genes interact, or how the price of one stock affects the price of another, for example. The description can be based on how the system may respond to manipulations and interventions (e.g. if gene A is silenced, what will happen to gene B, or if Microsoft's stock price goes up, will the stock price of Google follow and also go up?) Additionally, the time scale on which these influences can occur may be highly relevant in some exemplary applications. In finance related exemplary applications, for example, knowing the causal relationship alone may have no value if whether the influence would take place over a period of seconds, hours, or days was not also known. Similarly, with networks of genes, there may be a small window of opportunity to administer a drug, after which point the drug may not be effective. Thus, the exemplary embodiments of the methods, systems and software arrangements according to the present disclosure that are described herein can infer and/or determine causal relationships in data with a temporal component and use these relationships to make predictions about changes to a system, for example.

In general, causal relationships can be inferred and/or determined from numerical time-series data, which can include data that is not intrinsically numerical, but that may be represented in terms of vectors. For example, when provided with some set of atomic propositions describing the events comprising a data set, it may be inferred and/or determined when the propositions are true from the time series.

In terms of states or possible worlds, an exemplary query can be, e.g., if in some state where c is true, what is the probability of transitioning to another state where e is true, and how does this compare to the overall probability of being in an e state? If the first probability is significantly high, then it can be said that being in a c state has a high predictive value for later being in an e state.

In exemplary embodiments according to the present disclosure involving gene expression data generated by a microarray experiment, a proposition c may denote "metabolism is up-regulated." Then, a small subset of the microarray time series, shown in Table 1, for example, may indicate that c is true three times: at $t_1$, $t_2$, and $t_4$. From these exemplary frequencies, the transition probabilities may be determined. In certain exemplary embodiments, these time periods can be discrete instances, while in other exemplary embodiments, such time periods can be durations of time which are considered accordingly.

TABLE 1

Sample data

|   | $t_1$ | $t_2$ | $t_3$ | $t_4$ |
|---|---|---|---|---|
| a | 1.0 | −.9 | 2.0 | −.3 |
| b | −2.0 | −.5 | 1.0 | 2.0 |
| c | 1.6 | .6 | −.2 | 3.0 |
| d | −.3 | .4 | 1.5 | −.2 |
| e | −.1 | .8 | 2.0 | −1.0 |

It is possible for a causal relationship to be between c and e, and in the absence of further analysis, it can be more accurate to indicate that there is potential for a causal relationship. Accordingly, the relationships being inferred and/or determined can be translated into logical formulas and tools, ranging from, e.g., model checking which may be used to determine if the system satisfies these formulas. Then, an exemplary embodiment of the procedure, system, arrangement a computer accessible medium according to the present disclosure can include, e.g., encoding the properties of the exemplary system, generating formulas, and determining if the exemplary system satisfies certain exemplary formulas.

For example:

$$(a_{up} \wedge b_{down}) U c_{up} \rightsquigarrow^{\geq 1, \leq 4}_{\geq 0.9} d_{up}$$

can represent that the simultaneous up-regulation of gene a and suppression of gene b, until gene c becomes up-regulated, subsequently results in the up-regulation of gene d, with probability 0.9 in between 1 and 4 time units.

Accordingly, described herein are exemplary computer-accessible medium having stored thereon computer executable instructions for inferring and/or determining causation in time course data with temporal logic. The computer accessible medium can include, but not limited to, a hard drive, floppy disk, memory device (e.g., a memory stick), CD-ROM, RAM, ROM, combination thereof, etc. When the exemplary executable instructions for inferring and/or determining causation in time course data with temporal logic are executed by an exemplary processing arrangement, such instructions can configure the processing arrangement to encode the properties of the system, generate formulas, and determine if the exemplary system satisfies the formulas. According to further exemplary embodiments of the present disclosure, systems can be provided for inferring and/or determining causation in time course data with temporal logic. In various exemplary systems for inferring causation in time course data with temporal logic, the exemplary processing arrangement can be provided, which, when executed, can be configured to encode the properties of the system, generate formulas, and check if the system satisfies the formulas.

An exemplary formula generation procedure in accordance with the present disclosure can be utilized for the following situation: given a set of time series data representing events for which it can be hypothesized that there may exist a causal structure, underlying relationships forming this structure can be inferred an/or determined. A relationship between two events can mean that knowing of one event may allow the explanation or prediction of the other event. These inferred relationships can be of the form, e.g., "c causes e within time t with probability p" where c and e are logical formulas (where can include simple formulas such as, e.g., atomic propositions), and t is a window of time.

In other exemplary embodiments, causality formulas can be formulas for causal relationships. Such causality formulas can be non-deterministic and can be defined in terms of probabilities, where cause and effect are events. Two stipulations may be made. For example, it may be stipulated that causes are temporally prior to their effects. This stipulation can be made, for example, to assist with making certain inferences and determinations in accordance with the present disclosure. Additionally, various causes may raise the probabilities of their effects and describe how they may be inferred.

For exemplary causality formulas, probabilistic (e.g., non-deterministic) relationships can be represented in a probabilistic extension of CTL (Computation Tree Logic), PCTL. Alternatively or in addition, causal formulas can use a logic such as UTSL (Unified Temporal Stochastic Logic), which can incorporate statistical causal relationship determinations that may be extended for determining multiple causal relationships.

Beginning with a set of atomic propositions, A, and a structure (called a discrete time Markov chain (DTMC)) $K=<S, s^i, L, T>$, where:

S is a finite set of states;
$s_i$ is an initial state;
L: $S \rightarrow 2^A$ is a state labeling function; and
T: $S \times S \rightarrow [0,1]$ is a transition function such that:

$$\forall s \in S \sum_{s' \in S} T(s, s') = 1.$$

state formulae (those that hold within a state) and path formulae (those that hold along some sequence of states) can then be defined relative to this exemplary structure as follows:
1. Each atomic proposition is a state formula.
2. If $f_1$ and $f_2$ are state formulæ, so are $\neg f_1$, $f_1 \wedge f_2$, $f_1 \vee f_2$, and $f_1 \rightarrow f_2$.
3. If $f_1$ and $f_2$ are state formulæ, and t is a nonnega-tive integer or $\infty$, $f_1 U^{\leq t} f_2$ and $f_1 U^{\leq t} f_2$ are path formulæ.
4. If f is a path formula and $0 \leq p \leq 1$, $[f]_{\geq p}$ and $[f]_{>p}$ are state formulæ.

In this exemplary context, the exemplary "Until" formula in exemplary Equation 3 can mean that the first exemplary subformula (f1) holds at every state along the path until a state where the exemplary second subformula (f2) becomes true. The exemplary formula above, f1U≤tf2, can mean that f1 holds until f2 holds at some state, which can happen in less than or equal to t time units, for example. The exemplary modal operator "Unless" can be defined the same way, but with no guarantee that f2 will hold. In such exemplary case, f1 holds for a minimum of t time units. In exemplary equation 4, exemplary probabilities can be added to the exemplary formulae until and unless the exemplary path formulae can make exemplary state formulae. For example, $[f1U^{\leq t}f2]_{\geq p}$ (which can be abbreviated as $f1U^{\leq t}_{\geq p}f2$), can mean that with a probability of at least p, f2 can become true within t time units and f1 can hold along the exemplary path until the latter exemplary event happens. This can be an exemplary state formula with the probability calculated over the set of possible paths from the state, where the probability of a path is the product of the transition probabilities along the path, and the probability for a set of paths is the sum of the individual path probabilities.

Exemplary standard path quantifiers A ("for all paths") and E ("for some future path"), and exemplary temporal operators F ("eventually holds"), G ("holds for entire future path"), U ("for two properties, p holds until q holds" and q holds at some point), W (weak until or unless "p holds until q holds" but with no guarantee that q will ever hold), and X ("at the next state") may be used in some exemplary embodiments. In addition, an exemplary "leads to" operator may be used, which may be defined, for example, as:

$$f_1 \leadsto^{\leq t}_{\geq p} f2 \equiv AG[(f1 \rightarrow F^{\leq t}_{\geq p} f2)]$$

Such exemplary formula can indicate, e.g., that for every path from the current state, if, in a state where f1 holds, then through some exemplary series of transitions taking time ≤t, with probability p, a exemplary state where f2 holds can be reached. As defined, e.g., "leads-to" can also consider the exemplary case, where f1 and f2 are true at the same state, being one that satisfies this exemplary formula. Accordingly, a stipulation can be made that there be at least one transition between f1 and f2. In addition to being related to one or more exemplary temporal priority conditions for causality, this can also be consistent with a natural reasoning of the term "leads to." Thus, it is possible to write:

$$f1(\leadsto +)^{\geq t1, \leq t2}_{\geq p} f_2,$$

which can be interpreted to mean that t2 holds in between t1 and t2 time units with a probability p. If t1=t2, this exemplary embodiment can indicate that it takes t1 time units for f2 to hold.

Possible transitions from each state to each other state may be updated to reflect actual transitions and probabilities from the given input data.

Beginning with the basic conditions for causality, the exemplary embodiments can begin with those for prima facie causality. The temporal priority condition of the causal relationship in terms of the time that elapses between cause and effect can be specified. For example, if c occurs at some time t' and e occurs at a later time t, the relationship can be characterized by the time that elapses between them, |t'−t|. Thus, if it is desired to state that after c becomes true, e will be true with probability at least p in |t'−t| or fewer time units—and with at least one time unit between c and e—the following can be provided in accordance with various exemplary embodiments, as follows:

$$c \leadsto^{\geq 1, \leq |t'-t|}_{\geq p} e.$$

If it is desired for c to be earlier in time than e, then the upper bound can be infinity. According to various exemplary embodiments, c and e can be any valid PCTL formulae.

The exemplary probabilistic nature of the relationship between cause and effect can be described in terms of the probability of reaching c and e states and of the paths between c and e states. It can be possible (e.g., beginning from the initial state of the system) to reach a state where c is true, and that the probability of reaching a state where e is true (within the time bounds) can be greater after being in a state where c is true (probability ≥p) than it is by starting from the initial state of the system (probability <p). Exemplary embodiments may not begin with any prior knowledge of a structure, but rather aim to recreate knowledge of the structure from the data. For example, time course observations can be viewed as a sequence of the possible states occupied by the system.

From their ordering and frequency, it is possible to determine the possible transitions and their probabilities, which can characterize exemplary structures as described herein.

Prime facie, or potential, causes can be defined as follows in various exemplary embodiments:

c is a prima facie cause of e if the following conditions all hold:

1. $F_{>0}^{\leq \infty} c$,

2. $c \leadsto \xrightarrow[\geq p]{\geq 1, \leq \infty} e$, and

3. $F_{\leq p}^{\leq \infty} e$.

This exemplary definition inherently implies that there may be any number of transitions between c and e, as long as there is at least one, and the sum of the set of path probabilities is at least p. The probability of a path may be defined as the product of the transition probabilities along the path, for example. This time window can also be further restricted, for example, when background knowledge makes it possible, and the minimum condition is that c is earlier than e by at least one time unit, and the probability of e is raised.

Inferring and/or determining the significance of causal relationships can be achieved using the following exemplary method. To determine whether a particular c as a cause of e is insignificant, the average difference in probabilities for each prima facie cause of an effect in relation to all other prima facie causes of the effect can be determined or computed. In certain exemplary embodiments, beginning with X being the set of prima facie causes of e, for each $x \in X \backslash c$, the predictive value of c in relation to x can be computed or determined by, e.g., comparing the probability of transitioning to an e state from a c^x state versus a ¬ c^x state. If these probabilities are relatively similar, then c can be an insignificant cause of e. According to various exemplary embodiments, there may only be one such x, while there can be a number of other x's for which there can be a large difference in the computed probabilities. For example, with $$\epsilon_x(c,e) = P(e|c^\wedge x) - P(e|\neg c^\wedge x),$$ (Equation 6)

the following can be computed or determined:

$$\epsilon_{avg}(c,e) = \frac{\sum_{x \in X \backslash c} \epsilon_x(c,e)}{|X|}.$$

Thus, for each exemplary prima facie cause, its average potency can be determined as a predictor of its effect. If there is only one other cause that can make a cause c seem "spurious", but a number of other factors (that may be themselves actually spurious causes of the effect), then c can have a high value of this measure. According to various exemplary embodiments, this exemplary average can be used to determine exemplary c's significance.

It can be further defined that a cause, c, may be an $\epsilon$-insignificant cause of an effect, e, if: c is a prima facie cause of e and $\epsilon_{avg} < \epsilon$, where $\epsilon$ is a pre-defined threshold or may be determined as described herein.

Moreover, c, a prima facie cause of an effect, e, can be a significant cause of e if it is not an $\epsilon$-insignificant cause of e. An appropriate $\epsilon$ can be chosen using knowledge of, e.g., a causal relationship to be determined or a simulation, or chosen based on other statistical tests. Since a multitude of causal relationships (e.g., from thousands to hundreds of thousands) can be determined, the appropriate value of $\epsilon$ can be determined statistically can be determined using methods for false discovery rate (fdr) control. For example, the empirical Bayesian formulation proposed by Efron (2004) (B. Efron, *Large-Scale Simultaneous Hypothesis Testing: The Choice of a Null Hypothesis*, Journal of the American Statistical Association, 99(465):96-105, 2004) can be applied in accordance with certain exemplary embodiments of the present disclosure. The empirical Bayesian formulation can use an empirical rather than theoretical null, which can be better equipped for certain exemplary cases where the test statistics are dependent—as may be true in the case of certain exemplary complex causal structures.

In various exemplary embodiments, it can be beneficial to control the proportion of falsely rejected null causal relationships (e.g., when a causal relationship is incorrectly deemed significant) rather than the proportion of falsely accepted null causal relationships (e.g., when a causal relationship is incorrectly deemed insignificant). In accordance with various exemplary embodiments, since a large number of causal relationships can be determined, it can be accepted that some opportunities for discovery of associated data may be missed so long as the discoveries that are made are highly likely to be legitimate. For example, when such exemplary methods are applied to biomedical data, an exemplary goal can be to propose candidate gene or biomarker targets to explore for vaccine development. In such exemplary embodiments, it can be costly, even cost prohibitive, to explore each causal relationship, and therefore greater certainty about those that are proposed may be preferable.

Exemplary approaches can follow an approach of, e.g., assuming that the data contains two classes, such as interesting and uninteresting (or synonymously, e.g., significant and insignificant; or other appropriate terms). According to various exemplary embodiments, it may be assumed that the interesting class can be small relative to the un-interesting class, and that such classes can correspond to rejection and acceptance of the null causal relationship, with prior probabilities p0 and p1=1−p0. For example, p0 and p1 can be the prior probabilities of a case (e.g., a causal relationship) being in the "interesting" or "uninteresting" classes respectively, with these probabilities distributed according to an underlying density. The mixture density can be defined as:

$$f(z) = p_0 f_0(z) + p_1 f_1(z),$$

Then the posterior probability of a case being uninteresting given z can be:

$$Pr\{null|z\} = p_0 f_0(z)/f(z),$$

and the local false discovery rate can be:

$$fdr(z) = f_0(z)/f(z).$$ (Equation 10)

In this exemplary formulation, the p0 factor can be ignored, yielding an upper bound on fdr(z). Assuming that p0 is large (e.g., about 1), this exemplary simplification may not lead to a significant overestimation of fdr(z). It can also be preferable to estimate p0 and thus include such estimation in the fdr calculation, making fdr(z)=Pr{null|z}.

Exemplary steps for the significance determining portion of this exemplary procedure can be as follows:

1. Estimate f(z) from the observed z-values (for example by a spline fit);
2. Define the null density f0(z) from the data;
3. Calculate fdr(z) using exemplary Equation 10 described herein above.

Figure 4:
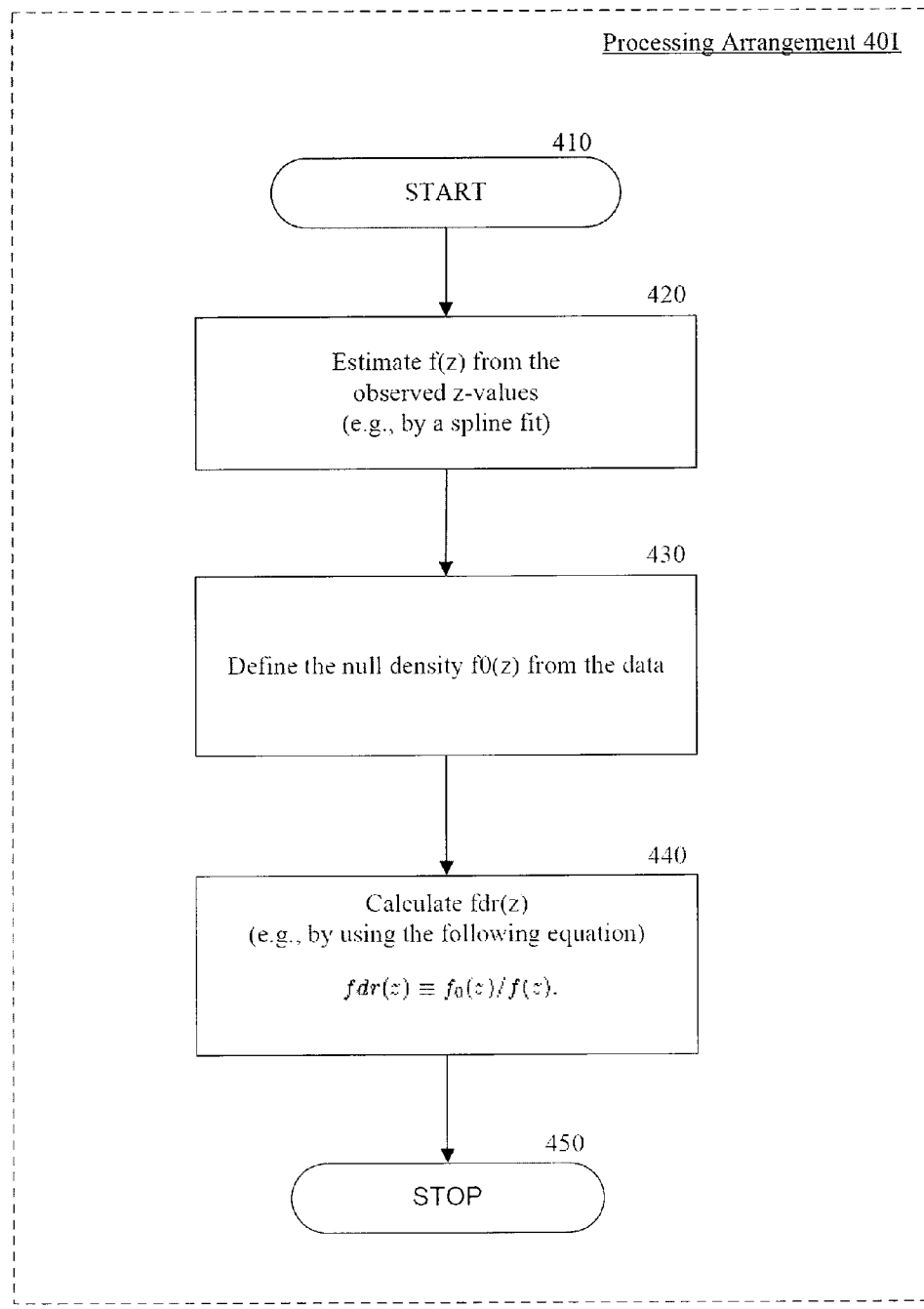
FIG. 4 is a flow diagram of an exemplary embodiment of a procedure for determining significance of causal relationships in accordance with the present disclosure, which is performed by an exemplary processing arrangement.
Figure 5:
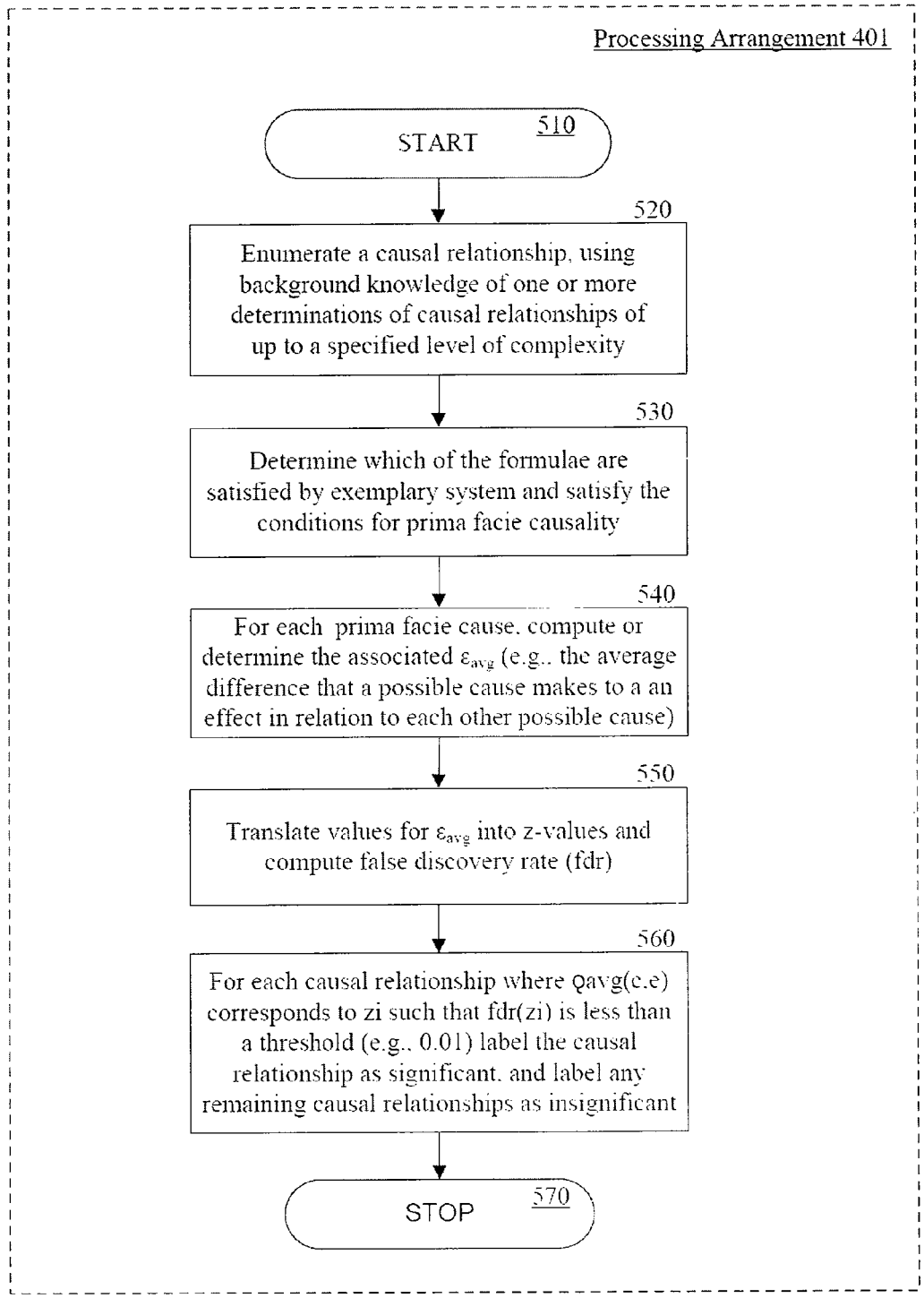
FIG. 5 is a flow diagram of another exemplary embodiment of the procedure for determining causation in time course data using temporal logic in accordance with the present disclosure, which is performed by the exemplary processing arrangement.

FIG. 4 is a flow diagram of an exemplary procedure for determining significance of causal relationships in accordance with the present disclosure. As shown in FIG. 5, which can be executed on and/or by a processing arrangement 401 (e.g., one or more micro-processors, or a collection thereof). Starting at step 410, the exemplary procedure can perform an exemplary estimate f(z) from observed z-values (for example by a spline fit)—step 420. In step 430, the exemplary procedure can define the null density f0(z) from the data. The exemplary procedure can then, in step 440, calculate fdr(z) using, e.g., exemplary Equation 10 described herein above.

Processing steps of various exemplary procedures in accordance with the present disclosure can include:
1. Enumerating one or a set of causal relationships, using background knowledge of one or more determinations of causal relationships up to a specified level of complexity;
2. Determining which formulae are satisfied by the exemplary system and satisfy the conditions for prima facie causality;
3. For each prima facie cause, computing or determine the associated $\epsilon_{avg}$;
4. Translating values for $\epsilon_{avg}$ into z-values and compute the fdr for each;
5. For each causal relationship where $\epsilon_{avg}(c,e)$ corresponds to zi such that fdr(zi) is less than a threshold (e.g., 0.01), labeling it as "significant", and labeling any other causal relationships (e.g., that do not meet the requirements specified in this step) as "insignificant".

FIG. 5 shows a flow diagram of an exemplary procedure for determining a causation in time course data using temporal logic in accordance with certain exemplary embodiments of the present disclosure. As shown in FIG. 5, the exemplary procedure can be executed on and/or by the processing arrangement 401 (e.g., one or more micro-processor or a collection thereof). Starting at step 510, the exemplary procedure can enumerate a causal relationship, using background knowledge of one or more determinations of causal relationships up to a specified level of complexity—step 420. In step 530, the exemplary procedure can, for each prima facie cause, compute or determine the associated $\epsilon_{avg}$. The exemplary procedure can then, in step 540, translate values for $\epsilon_{avg}$ into z-values and compute a false discovery rate (fdr). In step 550, the exemplary procedure can, for each causal relationship where $\epsilon_{avg}(c,e)$ corresponds to zi such that fdr(zi) is less than a threshold (e.g., 0.01), label it as "significant", and label any other causal relationships (e.g., that do not meet the requirements specified in this exemplary step) as "insignificant".

Figure 6:
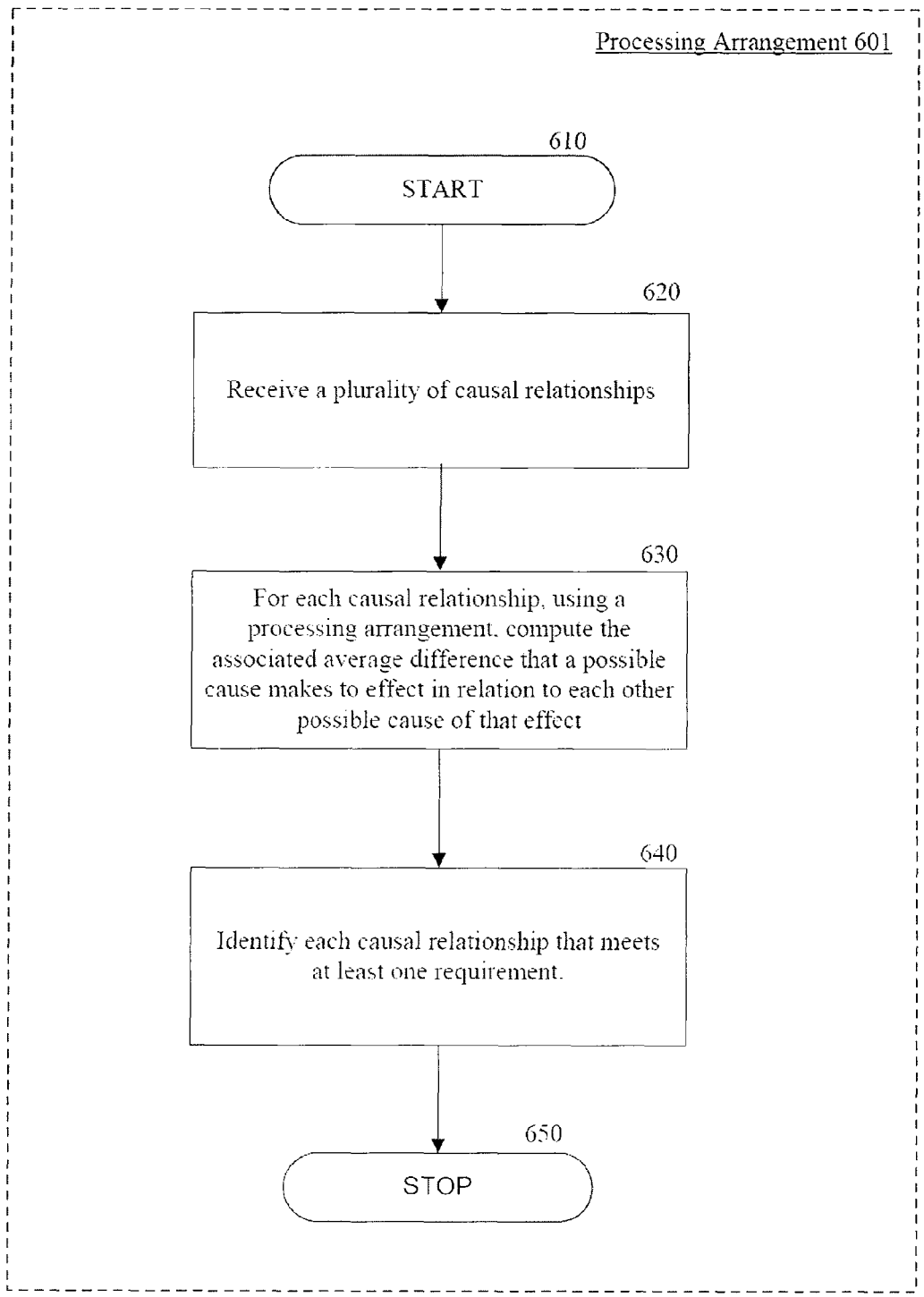
FIG. 6 is a flow diagram of still another exemplary embodiment of the procedure for determining causation in the time course data using temporal logic in accordance with the present disclosure, which is performed by the exemplary processing arrangement.

FIG. 6 shows a flow diagram of another exemplary procedure for determining the causation in the time course data using temporal logic in accordance with the present disclosure. As shown in FIG. 6, the exemplary procedure can be executed on and/or by a processing arrangement 601 (e.g., one or more micro-processors or a collection thereof). Starting at step 610, the exemplary procedure can receive a plurality of causal relationships—step 620. In step 630, the exemplary procedure can, for each causal relationship, using the processing arrangement 601, compute or determine the associated average difference that a possible cause makes to effect in relation to each other possible cause of that effect. The exemplary procedure can then, in step 540, identify each causal relationship that meets at least one requirement. Similar exemplary procedures are described herein above.

Figure 7:
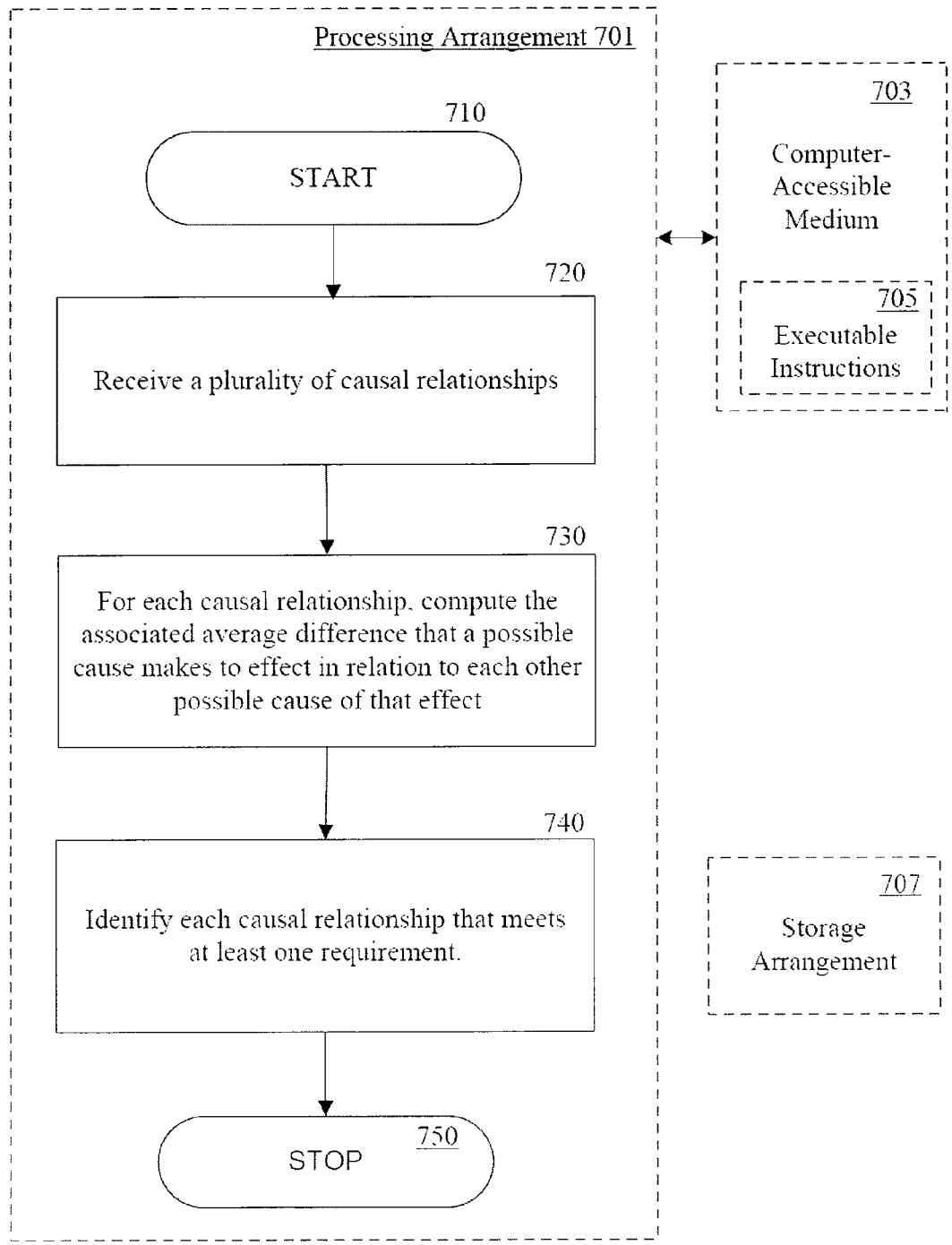
FIG. 7 is a block diagram of an exemplary embodiment system or arrangement configured in accordance with the present disclosure for determining causation in time course data using temporal logic.

FIG. 7 is a block diagram of an exemplary system and/or arrangement configured in accordance with certain exemplary embodiments of the present disclosure for determining the causation in time course data using temporal logic. As shown in FIG. 7, e.g., a computer-accessible medium 703 (e.g., as described herein above, storage device such as hard disk, floppy disk, memory stick, CD-ROM, RAM, ROM, etc., or a collection thereof) can be provided (in communication with the processing arrangement 701) The computer-accessible medium 703 can contain executable instructions 705 thereon. For example, when the processing arrangement 701 accesses the computer-accessible medium 703, retrieves executable instructions 705 therefrom and then executes the executable instructions 705, the processing arrangement 701 can be configured or programmed to receive a plurality of causal relationships in block 720, and, in block 730, for each causal relationship, compute or determine the associated average difference that a possible cause makes to effect in relation to each other possible cause of that effect. Further, the processing arrangement 701, based on the executable instructions 705, can be configured to identify each causal relationship that meets at least one requirement. In addition or alternatively, a software arrangement 707 can be provided separately from the computer-accessible medium 703, which can provide the instructions to the processing arrangement 701 so as to configure the processing arrangement to execute the procedures 710-740, as described herein above.

According to certain exemplary embodiments of the present disclosure, exemplary causal relationships can be defined in terms of probabilistic temporal logic formulas and encoded datasets as logical models. For example, inferences can be achieved through generating causal formulas and using model checking to determine whether the model satisfies them.

Since complex PCTL formulas can be generated, inferences can be restricted in terms of the type of formulas determined and the length of time between cause and effect. An exemplary formula of particular interest can vary depending on, e.g., the data being analyzed as well as background knowledge. For example, an exemplary embodiment of a method and/or a procedure according to the present disclosure is described herein that can be used when there is no prior knowledge. In various exemplary embodiments, the time between cause and effect can be restricted to be, e.g., one time unit or some other fixed length of time, which can be expressed in discrete and/or fixed time units, and/or be based on time associated with events or other criteria, for example.

According to various exemplary embodiments, it is possible to look for and/or enumerate formulas that are conjunctions of events. In one exemplary case, where there can be only one unit of time between cause and effect and only conjunctions of events are being determined, a set of formulas can be used to test each event as a possible prima facie cause of each other event. The prima facie causes of common effects can be evaluated to determine whether any are supplementary causes (e.g., replacing the two original prima facie causes in the set of causes with the resulting conjunction of causes). Further, for each set of prima facie causes of an effect, spuriousness may be determined as described herein.

The complexity of determining whether the model satisfies the formula can also be analyzed. For example, the computational complexity of forming the model can depend on, e.g., the upper bound on time windows, $|A|$, and the number of time points in the data set. Exemplary states can be labeled with subformulas that are true within them, incrementally building the full formula. For example, the time complexity of this exemplary algorithm can be shown to be $O(t_{max}*(|S|+|E|)*|f|)$, where $t_{max}$ is the maximum time parameter in the formula, S is the number of states, E the number of transitions with non-zero probability and f is the size of the formula (e.g., the number of propositional connectives and modal operators, plus the sum of the sizes of the modal operators in the formula).

As described herein, exemplary embodiments of the present disclosure can include computer-accessible medium for carrying or having computer-executable instructions or data structures stored thereon. Such computer-accessible medium can be any available media that can be accessed by a general purpose or special purpose computer. By way of example, and not limitation, and as indicated to some extent herein above, such computer-accessible medium can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications link or connection (either hardwired, wireless, or a combination of hardwired or wireless) to a computer, the computer properly views the connection as a computer-accessible medium. Thus, any such a connection is properly termed a computer-accessible medium. Combinations of the above should also be included within the scope of computer-accessible medium. Computer-executable instructions can comprise, for example, instructions and data which cause a general purpose computer, special purpose computer, or special purpose processing device or other devices (e.g., mobile phone, personal digital assistant, etc.) with embedded computational modules or the like configured to perform a certain function or group of functions.

Those having ordinary skill in the art will appreciate that the present disclosure can be practiced in network computing environments with many types of computer system configurations, including personal computers, hand-held devices, multi-processor systems, microprocessor-based or programmable electronics and devices, network PCs, minicomputers, mainframe computers, and the like. Exemplary embodiments in accordance with the present disclosure can also be practiced in distributed computing environments where tasks are performed by local and remote processing devices that are linked (either by, e.g., hardwired links, wireless links, or a combination of hardwired and wireless links) through a communications network. In a distributed computing environment, program modules can be located in both local and remote memory storage devices.

Exemplary Causal Formula Generation for Simulated Neural Spike Trains

An exemplary data set can comprise a series of synthetically generated patterns, and thus can have the capability to reveal the true causal neural networks that may have been embedded in corresponding exemplary simulations, for example. Exemplary data can be generated to mimic multi-neuronal electrode array (MEA) procedures, in which neuron firings may be tracked over a period of time. An exemplary inference and/or determination procedure in accordance with the present disclosure can be executed on this exemplary set of data, each containing, e.g., 100,000 firings of a set of neurons, and each denoted by a character of the English alphabet, for example. Each exemplary data set can be embedded with a different causal network.

FIG. 1 illustrates an exemplary causal structure 100 in accordance with the exemplary embodiments of the present disclosure, which illustrates that a neuron A 110 at the tail can cause a neuron at the head, such as neurons 110 H, I, J and/or K, to fire within a defined time window with a relatively high probability. This can be one of a plurality (e.g., five) structures recovered. Structure 100 may be one of the more complex causal structures to infer and determine, as neurons 110 D and E can both be highly correlated with neurons 110 H and I.

As illustrated in FIG. 1, for example, the exemplary causal structure 100 can be a binary tree of four levels. At each time point a neuron can fire randomly or can be triggered to fire by one of its cause neurons. A noise level can be selected on which the firing of neurons can be dependent. Known background knowledge can be used by the exemplary procedure. For example, there can be a 20 time unit refractory period after a neuron fires (which can be called, e.g., a causal neuron) and then a subsequent 20 time unit period of time when it may trigger another neuron to fire. Accordingly, an exemplary procedure can search for causal relationships between two or more neurons, in which one neuron causes another neuron to fire during a time-period of 20-40 time units after the causal neuron fires. Accordingly, exemplary condition 2 of prima facie causality can be replaced with $$c \rightsquigarrow_{\geq p}^{\geq 20, \leq 40} e,$$

where c and e are individual neurons.

This exemplary procedure can enumerate, e.g., up to 641 prima facie causal relationships. As one having ordinary skill in the art will appreciate, various exemplary causal structures and exemplary embodiments in accordance with the present disclosure can provide for more or less than 641 prima facie causal relationships, which can be dependent on, e.g., the configuration and size of the causal structure. For example, an exemplary causal structure can be a tree in which a causal neuron firing can trigger more than two other neurons to fire, or may trigger only one other neuron to fire. According to various exemplary embodiments, an exemplary causal structure can include neurons that cause a different number of other neurons to fire.

An exemplary empirical null can be computed or determined from the computed $\epsilon_{avg}$ for each causal relationship using various methods and/or procedures, such as the method of Jin and Cai with the R code (Jin and Cai, 2006) (J. Jin and T. T. Cai, *Estimating the Null and the Proportion of non-Null effects in Large-scale Multiple Comparisons*, Journal of the American Statistical Association, 102:495-506, 2006).

Figure 2:
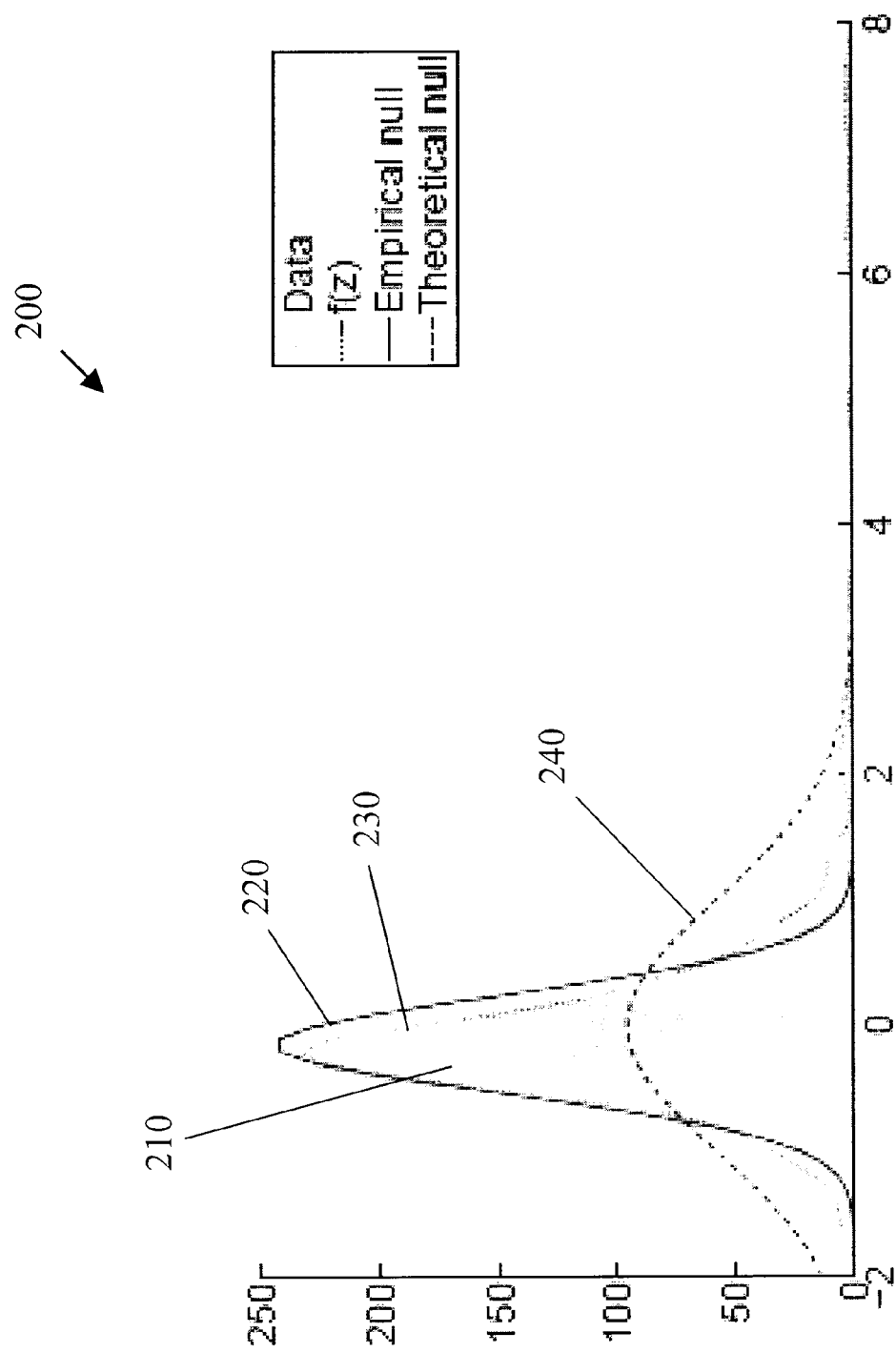
FIG. 2 is an exemplary graph of a neural spike train example in accordance with the present disclosure, in which pair-wise causal relationships can be determined taking into account known temporal constraints on an exemplary system.

FIG. 2 illustrates an exemplary graph of an exemplary neural spike train in accordance with exemplary embodiments of the present disclosure, in which pairwise causal relationships can be determined taking into account known temporal constraints on the exemplary system. The exemplary results of the exemplary empirical null 230 are shown with an exemplary histogram 200 of the computed z-values for the causal relationships, which can include exemplary data indicators 210 and exemplary f(z) indicators 220. The exemplary empirical null indicator 230 in this exemplary embodiment can be represented by N(−0.14, 0.39) so it can be shifted slightly to the left of the theoretical null indicator 240 and significantly narrower. As illustrated in FIG. 2, the tail of the exemplary distribution extends relatively far to the right, continuing up to, e.g., 8 standard deviations away from the mean.

Figure 3:
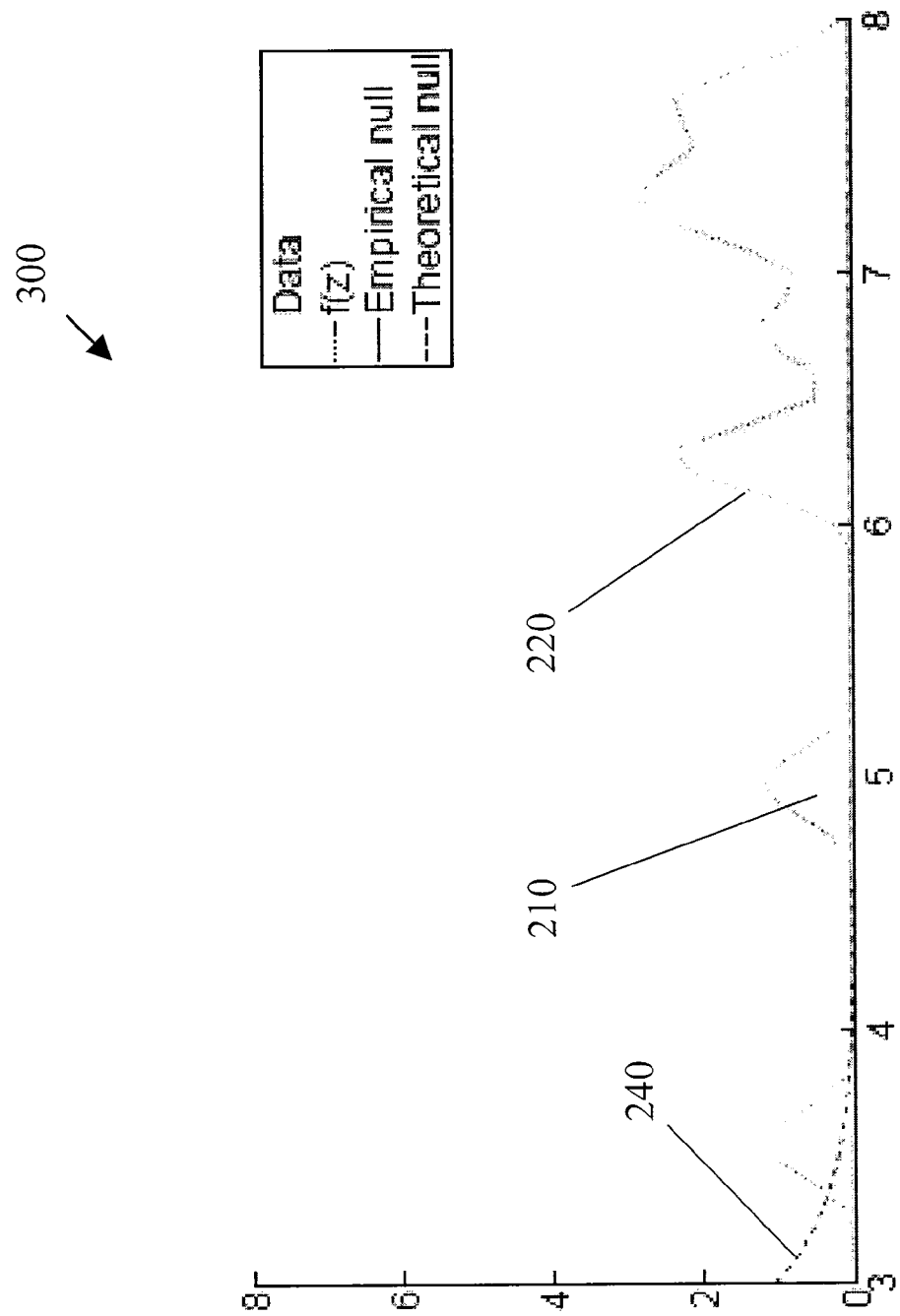
FIG. 3 is an exemplary graph of the neural spike train example illustrating a close up of the tail area shown in FIG. 2.

FIG. 3 shows a close up of the exemplary graph of the tail area 300 of the exemplary neural spike train illustrated in FIG. 2. As shown in FIG. 3, the exemplary results can be consistent with the known causal structures that may be used to create the simulated data indicators 210. The exemplary genuine causal relationships shown in FIG. 1 can be the exemplary causal relationships with z-values greater than three, for example. It should be understood that there can be other exemplary causal relationships that, like the ten exemplary genuine causal relationships, can have a false discovery rate of zero. With no prior knowledge, two exemplary methods and/or procedures for determining the exemplary actual causes can be utilized.

First, e.g., in an exemplary case where there are few causal relationships found, such as in this example, the causal relationships can be filtered by examining the individual causal relationships. For example, if there are two causes of an effect, e.g., one with a z-value of 7 and the other with a value of 1, then it can be inferred that the former may be more likely to be the genuine cause being that it has a higher z-value. Further analysis can be performed to determine the validity this exemplary inference.

Second, e.g., in cases where there may be a larger number of prima facie causes of each effect, each such cause and effect can be treated as a family of causal relationships, processing the exemplary procedure after the computation of $\epsilon_{avg}$ on each of these families individually. As one having ordinary skill in the art can appreciate, it can also be possible to better estimate the empirical null distribution in accordance with the present disclosure.

Described herein are exemplary embodiments of an exemplary unified framework that can capture, e.g., at equal or about levels, both probabilistic dependencies and temporal priorities that may be inherent in causality relationships. For example, the temporal and probabilistic relationship between smoking and lung cancer can be considered. There are currently warnings on cigarettes in the UK that state "smoking kills." This statement does not tell us how likely it is that a person who smokes these labeled cigarettes will die from smoking or how long it will take for death to occur. Given the choice between packages labeled "smoking kills in 90 years" and "smoking kill within 10 years", one may make a very different decision than when confronted with one that simply says "smoking kills." The probability of death in either case can also be introduced. The first case may be with a probability of 1 with the latter being much smaller. This additional information and the way it can affect one's decision strongly indicates a need for a more detailed description than has heretofore been provided. For example, when describing a causal relationship, there appears to be a strong need to also describe its probability and the time over which it takes place.

The foregoing merely illustrates the principles of the present disclosure. Various modifications and alterations to the described embodiments will be apparent to those having ordinary skill in the art in view of the teachings herein. It will thus be appreciated that those having ordinary skill in the art will be able to devise numerous systems, arrangements, computer-accessible medium and methods which, although not explicitly shown or described herein, embody the principles of the present disclosure and are thus within the spirit and scope of the present disclosure. It will further be appreciated by those having ordinary skill in the art that, in general, terms used herein, and especially in the appended claims, are generally intended as open. For example, the term "average," unless otherwise provided for herein, can be interpreted as and/or include, e.g., mean, median and/or mode with, e.g., an associated variance and standard deviation, or any other statistical measure(s) as may be appropriate. In addition, to the extent that the prior art knowledge has not been explicitly incorporated by reference herein above, it is explicitly being incorporated herein in its entirety. All publications referenced above are incorporated herein by reference in their entireties.

What is claimed is:

1. A computer implemented method for determining at least one causal relationship of at least two elements associated with time course data, comprising:
   receiving data associated with a plurality of particular causal relationships;
   for each causal relationship, using at least one hardware computing arrangement, determining average characteristics associated with cause and effects of the particular causal relationships; and
   identifying, using a false discovery rate control procedure, the particular causal relationships that meet at least one predetermined requirement as a function of the average characteristics so as to generate at least one causal relationship.

2. The method of claim 1, wherein the two elements over which causal relationships are determined are at least one of objects, a collection of objects, individuals, collections of individuals, events, a collection of events, logical formulas over objects, individuals and events, or temporal logical formulas over objects, individuals and events.

3. The method of claim 1, wherein the characteristics associated with cause and effects of the particular causal relationships include an associated average difference that a particular cause makes to a particular effect in relation to other potential causes of that particular effect.

4. The method of claim 1, wherein the data comprises background information associated with at least one of the particular causal relationships.

5. The method of claim 1, further comprising translating values for the average characteristics associated with cause and effects of the particular causal relationships into z-values.

6. The method of claim 1, wherein the particular causal relationships are expressed in terms of a probabilistic temporal logic.

7. The method of claim 1, further comprising at least one of displaying or storing information associated with the causal relationship in a storage hardware arrangement in at least one of a user-accessible format or a user-readable format.

8. A non-transitory computer-readable medium containing executable instructions thereon, wherein when at least one computing hardware arrangement executes the instructions, the at least one computing hardware arrangement is configured to perform procedures comprising:
   receiving data associated with a plurality of particular causal relationships;
   for each causal relationship, determining average characteristics associated with cause and effects of the particular causal relationships; and
   identifying, using a false discovery rate control procedure, the particular causal relationships that meet at least one predetermined requirement as a function of the average characteristics so as to generate at least one causal relationship.

9. The computer-accessible medium of claim 8, wherein the characteristics associated with cause and effects of the particular causal relationships include an associated average difference that a particular cause makes to a particular effect in relation to other potential causes of that particular effect.

10. The computer-accessible medium of claim 8, wherein the executable instructions include procedures associated with a model of causality which comprises a plurality of particular causal relationships expressed in terms of a probabilistic temporal logic.

11. The computer-accessible medium of claim 8, wherein the at least one causal relationship comprises a plurality of causal relationships, and wherein the data comprises background information associated with at least one of the plurality of causal relationships.

12. The computer-accessible medium of claim 8, wherein, when the processing arrangement executes the instructions, the processing arrangement is further configured to translate values for the average characteristics associated with cause and effects of the particular causal relationships into z-values.

13. A system for determining a causal relationship of at least two elements of time course data, comprising:
 a non-transitory computer-readable medium having executable instructions thereon, wherein when at least one computing hardware arrangement executes the instructions, the at least one computing hardware arrangement is configured to:
 receive data associated with a plurality of particular causal relationships;
 for each causal relationship, determine average characteristics associated with cause and effects of the particular causal relationships; and
 identify, using a false discovery rate procedure, the particular causal relationships that meet at least one predetermined requirement as a function of the average characteristics so as to generate at least one causal relationship.

14. The system of claim 13, wherein the executable instructions include procedures associated with a model of causality which comprises a plurality of particular causal relationships expressed in terms of a probabilistic temporal logic.

15. The system of claim 13, wherein the data comprises background information associated with at least one of the particular causal relationships.

16. The system of claim 13, wherein when the processing arrangement executes the instructions, the processing arrangement is further configured to translate values for the average characteristics associated with cause and effects of the particular causal relationships into z-values.

17. A non-transitory computer-readable medium containing a model of causality and executable instructions thereon, wherein when at least one computing hardware arrangement executes the instructions, the at least one computing hardware arrangement is configured to perform procedures comprising:
 receiving data associated with a plurality of particular causal relationships;
 for each causal relationship, determining average characteristics associated with cause and effects of the particular causal relationships; and
 identifying the particular causal relationships that meet at least one predetermined requirement as a function of the average characteristics so as to generate at least one causal relationship, wherein the model of causality comprises a plurality of particular causal relationships expressed in probabilistic temporal logic.

18. The computer-accessible medium of claim 17, wherein the two elements over which causal relationships are determined are at least one of objects, a collection of objects, individuals, collections of individuals, events, a collection of events, logical formulas over objects, individuals and events, or temporal logical formulas over objects, individuals and events.

19. The computer-accessible medium of claim 17, wherein the characteristics associated with cause and effects of the particular causal relationships include an associated average difference that a particular cause makes to a particular effect in relation to other potential causes of that particular effect.

20. A computer implemented method containing a model of causality for determining at least one causal relationship of at least two elements associated with time course data, comprising:
 receiving data associated with a plurality of particular causal relationships;
 for each causal relationship, using at least one computing hardware arrangement, determining average characteristics associated with cause and effects of the particular causal relationships; and
 identifying the particular causal relationships that meet at least one predetermined requirement as a function of the average characteristics so as to generate at least one causal relationship, wherein the model of causality comprises a plurality of particular causal relationships expressed in probabilistic temporal logic.

21. The method of claim 20, wherein the two elements over which causal relationships are determined are at least one of objects, a collection of objects, individuals, collections of individuals, events, a collection of events, logical formulas over objects, individuals and events, or temporal logical formulas over objects, individuals and events.

22. The method of claim 20, wherein the characteristics associated with cause and effects of the particular causal relationships include an associated average difference that a particular cause makes to a particular effect in relation to other potential causes of that particular effect.

23. The method of claim 20, further comprising at least one of displaying or storing information associated with the causal relationship in a storage arrangement in at least one of a user-accessible format or a user-readable format.

24. A system for determining a causal relationship of at least two elements of time course data, comprising:
 a non-transitory computer-medium containing a model of causality and having executable instructions thereon, wherein when at least one computing hardware arrangement executes the instructions, the at least one computing hardware arrangement is configured to:
 receive data associated with a plurality of particular causal relationships;
 for each causal relationship, determine average characteristics associated with cause and effects of the particular causal relationships; and
 identify the particular causal relationships that meet at least one predetermined requirement as a function of the average characteristics so as to generate at least one causal relationship, wherein the model of causality comprises a plurality of particular causal relationships expressed in probabilistic temporal logic.

25. The system of claim 24, wherein the two elements over which causal relationships are determined are at least one of objects, a collection of objects, individuals, collections of individuals, events, a collection of events, logical formulas over objects, individuals and events, or temporal logical formulas over objects, individuals and events.

26. The system of claim 24, wherein the characteristics associated with cause and effects of the particular causal relationships include an associated average difference that a particular cause makes to a particular effect in relation to other potential causes of that particular effect.

27. A computer implemented method for determining at least one causal relationship of at least two elements associated with time course data, comprising:
 receiving data associated with a plurality of particular causal relationships, the particular causal relationships being expressed in terms of a probabilistic temporal logic;

for each causal relationship, using at least one computing hardware arrangement, determining average characteristics associated with cause and effects of the particular causal relationships; and identifying the particular causal relationships that meet at least one predetermined requirement as a function of the average characteristics so as to generate at least one causal relationship.

28. The method of claim 27, wherein the two elements over which causal relationships are determined are at least one of objects, a collection of objects, individuals, collections of individuals, events, a collection of events, logical formulas over objects, individuals and events, or temporal logical formulas over objects, individuals and events.

29. The method of claim 27, wherein the characteristics associated with cause and effects of the particular causal relationships include an associated average difference that a particular cause makes to a particular effect in relation to other potential causes of that particular effect.

30. The method of claim 27, further comprising at least one of displaying or storing information associated with the causal relationship in a storage arrangement in at least one of a user-accessible format or a user-readable format.

31. The method of claim 27, wherein the particular causal relationships are identified using a false discovery rate control procedure.

32. A computer-readable medium containing executable instructions thereon, wherein when at least one computing hardware arrangement executes the instructions, the at least one computing hardware arrangement is configured to perform procedures comprising:

receiving data associated with a plurality of particular causal relationships;

for each causal relationship, determining average characteristics associated with cause and effects of the particular causal relationships; and identifying the particular causal relationships that meet at least one predetermined requirement as a function of the average characteristics so as to generate at least one causal relationship, wherein the executable instructions include procedures associated with a model of causality which comprises a plurality of particular causal relationships expressed in terms of a probabilistic temporal logic.

33. The computer-accessible medium of claim 32, wherein the two elements over which causal relationships are determined are at least one of objects, a collection of objects, individuals, collections of individuals, events, a collection of events, logical formulas over objects, individuals and events, or temporal logical formulas over objects, individuals and events.

34. The computer-accessible medium of claim 32, wherein the characteristics associated with cause and effects of the particular causal relationships include an associated average difference that a particular cause makes to a particular effect in relation to other potential causes of that particular effect.

35. The computer-accessible medium of claim 32, wherein the particular causal relationships are identified using a false discovery rate control procedure.

36. A system for determining a causal relationship of at least two elements of time course data, comprising:

a computer-readable medium having executable instructions thereon, wherein when at least one computing hardware arrangement executes the instructions, the at least one computing hardware arrangement is configured to:

receive data associated with a plurality of particular causal relationships;

for each causal relationship, determine average characteristics associated with cause and effects of the particular causal relationships; and identify the particular causal relationships that meet at least one predetermined requirement as a function of the average characteristics so as to generate at least one causal relationship, wherein the executable instructions include procedures associated with a model of causality which comprises a plurality of particular causal relationships expressed in terms of a probabilistic temporal logic.

37. The system of claim 36, wherein the two elements over which causal relationships are determined are at least one of objects, a collection of objects, individuals, collections of individuals, events, a collection of events, logical formulas over objects, individuals and events, or temporal logical formulas over objects, individuals and events.

38. The system of claim 36, wherein the characteristics associated with cause and effects of the particular causal relationships include an associated average difference that a particular cause makes to a particular effect in relation to other potential causes of that particular effect.

39. The system of claim 36, wherein the particular causal relationships are identified using a false discovery rate control procedure.

* * * * *